(12) United States Patent
Hofmann et al.

(10) Patent No.: US 7,540,934 B2
(45) Date of Patent: Jun. 2, 2009

(54) METHOD AND APPARATUS FOR IRRADIATION WELDING OF TWO THERMOPLASTIC COMPONENTS

(75) Inventors: Alexander Hofmann, Erlangen (DE); Stefan Hierl, Sindlbach (DE); Frank Brunnecker, Memmelsdorf (DE)

(73) Assignee: LPKF Laser & Electronics AG, Garbsen (DE)

( * ) Notice: Subject to any disclaimer, the term of this patent is extended or adjusted under 35 U.S.C. 154(b) by 372 days.

(21) Appl. No.: 11/045,120

(22) Filed: Jan. 31, 2005

(65) Prior Publication Data

US 2005/0167042 A1     Aug. 4, 2005

(30) Foreign Application Priority Data

Jan. 30, 2004    (DE) ................. 10 2004 004 985

(51) Int. Cl.
*B32B 37/04* (2006.01)
(52) U.S. Cl. ................... 156/272.8; 156/379.6
(58) Field of Classification Search .......... 156/272.2, 156/272.8, 273.7, 351, 379.6, 379.8
See application file for complete search history.

(56) References Cited

U.S. PATENT DOCUMENTS

| | | | | |
|---|---|---|---|---|
| 3,769,117 A | * | 10/1973 | Bowen et al. | 156/69 |
| 4,781,787 A | * | 11/1988 | Weissfloch et al. | 156/507 |
| 5,286,327 A | * | 2/1994 | Swartz | 156/273.3 |
| 6,129,809 A | * | 10/2000 | Ellenberger et al. | 156/351 |
| 6,444,946 B1 | | 9/2002 | Korte | |
| 6,465,757 B1 | * | 10/2002 | Chen | 219/121.63 |
| 2002/0179252 A1 | * | 12/2002 | Zuehlke et al. | 156/379.8 |
| 2003/0094240 A1 | * | 5/2003 | Sarmiento | 156/379.8 |
| 2006/0144509 A1 | * | 7/2006 | Hofmann et al. | 156/272.8 |

FOREIGN PATENT DOCUMENTS

| | | | |
|---|---|---|---|
| CH | EP1508428 | * | 8/1997 |
| DE | 199 19 191 A1 | | 11/2000 |
| DE | 199 24 469 A1 | | 11/2000 |
| DE | 102 35 892 A1 | | 9/2003 |

OTHER PUBLICATIONS

Machine translation of EP1508428, Aug. 2003, Detailed description pp. 1-2.*

* cited by examiner

*Primary Examiner*—John L Goff
*Assistant Examiner*—Daniel McNally
(74) *Attorney, Agent, or Firm*—Browdy and Neimark, P.L.L.C.

(57) ABSTRACT

In a method and an apparatus for irradiation welding of two thermoplastic components, a local temperature maximum, which circulates together with the laser beam and increases from cycle to cycle, and a correspondingly circulating, locally increased clamping pressure are generated in the area of joining.

10 Claims, 3 Drawing Sheets

METHOD AND APPARATUS FOR IRRADIATION WELDING OF TWO THERMOPLASTIC COMPONENTS

BACKGROUND OF THE INVENTION

1. Field of the Invention

The invention relates to a method of irradiation welding of two thermoplastic components by producing a weld seam in an area of joining between the absorptive and transmissive component parts by means of an energy beam, in particular laser beam. The invention further relates to an apparatus for putting the method into practice.

2. Background Art

For better understanding of the invention, the fundamentals of laser irradiation welding of plastics are going to be explained, taken in conjunction with prior art systems.

In laser irradiation welding of plastics, laser irradiation penetrates the first weld seamed part that is turned towards the beam source and is being absorbed by the second weld seamed part by only minor depth of penetration of the surface and converted into heat. By heat conduction the transmissive weld seamed part is equally being melted.

In so-called quasi simultaneous welding, the laser beam is being run rapidly along the weld contour for several times. Quasi simultaneous welding of plastic components has established as a very common method in laser irradiation welding. U.S. Pat. No. 6,444,946 B1 describes a corresponding method, specifying that the entire weld seam is being plasticized substantially in a single cycle after being heated to an "intermediate temperature" by a plurality of cycles. The principal idea of this method consists in the weld seam being heated as uniformly as possible; any spatial temperature gradients along the weld seam are not desired.

According to this document, in case of a closed weld seam, all areas of the weld seam are in a solid phase or all sectional areas are simultaneously in a plasticized condition, uniform melting of the seam taking place by the action of the joining pressure.

This welding method has the following drawbacks:

Current examinations of the working mechanism of plastics welding have shown that high clamping pressure positively affects the welding result. The assumption is that high contact periods of the parts being joined, accompanied with correspondingly high pressure, work in favour of molecular exchange processes (diffusion). Additionally, high clamping pressures improve the thermal contact of the parts being joined and accelerate the heat conduction into the top layer. The load that may act on a component part is as a rule limited, because damages of the part will produce easily. With the clamping force that is applied in a joining method according to U.S. Pat. No. 6,444,946 B1 spreading uniformly across the entire weld seam, given the fact that, without obstruction to expansion, the weld seam would stay nearly level by simultaneous plasticizing and the inferior temperature gradients, the locally produced clamping pressure decreases. With the effects of process acceleration of the high clamping pressure not being exploited, the efficiency, and thus economic profitability, of the welding method decrease.

In connection with quasi simultaneous welding, so-called weld seam-run monitoring is frequently used as a method of process diagnostics. In this case, the length is measured, by which the parts move towards one another under the action of joining pressure and with the seam plasticized. As a rule, this takes place by way of detection of the motion of the movable clamping plate. Drawbacks reside in that weld seam interruptions cannot be detected, because they do not affect the motion of the clamping plate, provided the spatial expansion of seam interruption is insignificant as compared to the entire seam contour, which is the rule.

Heat conduction, which confers energy from the absorptive part being joined on the transmissive part being joined, is strongly time-dependent. For the transmissive top layer to melt, which is necessary for integral material joining, both parts being joined must stay in thermal contact for a certain time. During this time, due to the nearly uniform plasticizing of the weld seam, molten polymer compound is displaced from the area of joining by the joining pressure. The result is undesired escape of energy from the area of welding that comprises the heated polymer compound, which is accompanied with reduced process efficiency. Additionally, displaced polymer compound may flow into component areas where it is not desired for optical or functional reasons.

Notches in the absorbtive part being joined negatively affect the welding process. The notch can only be filled with polymer compound when the adjacent areas have been plasticized and a sufficient amount of polymer compound has been displaced for the notch to be closed. Only then the transmissive joining part above the notch can be supplied with energy by thermal contact via heat conduction. In addition to this negative effect, the polymer at the bottom of the notch can be damaged thermally, because it is heated as are intact areas of the weld seam seam, while however only little thermal energy is led by heat conduction to the cold top layer.

In contour welding the weld seam is being plasticized locally, the integral joint occurring directly after a single irradiation job. Consequently this process is accompanied with some restrictions too:

There is no setting motion towards each other of the two parts being joined, which is why any geometric compensation for component tolerances is not possible.

Since the top layer of the joint is being plasticized mainly by heat conduction from the bottom layer, integral joining will take a certain time. For the polymer of the absorbtive bottom layer not to be damaged, the maximally employable laser energy density is limited upwards. Both circumstances explain why only inferior feed velocities can be used in contour welding, which is accompanied with prolonged process times than in quasi simultaneous welding.

SUMMARY OF THE INVENTION

Proceeding from the described problems of prior art irradiation methods, it is an object of the invention to improve the corresponding methods and apparatuses in such a way that simple means, in terms of the method and apparatus, will do for rendering a welding process more reliable and efficient, offering safe results and compensating for any component flaws.

Accordingly, the method of irradiation welding according to the invention excels as follows:

the energy beam acts on the absorptive component part in several cycles such that a local temperature maximum that circulates together with the energy beam and increases from cycle to cycle and a correspondingly circulating, locally raised clamping pressure are generated along the area of joining;

the transmissive component part is continuously heated by the absorptive component part in the area of joining, corresponding to the circulating temperature maximum;

the welding process then takes place by plasticization of the two component parts in a circulating area of plasticization that is defined in the longitudinal direction of the weld seam, equally corresponding to the circulating temperature maximum; and both component parts are interlocked by a clamping device which produces a minimum clamping power.

The term "area of plasticization" is to be understood as a sector of the area of joining between the two parts being joined, where significant welding of the parts being joined takes place by reason of their degree of plasticization.

For putting this method into practice, an apparatus for irradiation welding of two thermoplastic components is comprised as follows:

a beam source and beam guide for production and guidance of an energy beam, in particular a laser beam, towards the absorptive component part;

a beam deflection unit for displacement of the energy beam in cycles along the area of joining such that a local temperature maximum that circulates together with the energy beam and increases from cycle to cycle and a correspondingly circulating, locally raised clamping pressure are generated along the area of joining; and a clamping device which interlocks the two component parts by a minimum clamping power.

As will be described in detail below, the circulating local temperature maximum which rises from cycle to cycle accompanied with a correspondingly circulating welding process can be handily termed "tumble welding". In contrast to the quasi simultaneous welding according to U.S. Pat. No. 6,444,946 B1, the effect of tumble welding resides in not keeping the temperature along the weld seam as uniform as possible, but in producing spatial temperature gradients along the weld seam and, by repeatedly scanning, continuously to raise the lowest as well as the highest temperature along the weld seam. Nevertheless, in doing so, a setting motion of the two parts being joined can be obtained by circulating, "tumbling" melting of the absorptive part.

It differs from contour welding substantially by repeated scanning of the weld seam contour at high feed velocities (for example 500 mm/s) than in contour welding (typical feed 30 mm/s) and by the use of an interlockable clamping device.

The desired spatial temperature gradients in tumble welding are obtained by slower feed velocities (for example 500 mm/s) than in quasi simultaneous laser welding (for example typically 3000 mm/s), with really necessary feed velocities for "tumble welding", as well as for quasi simultaneous welding, strongly depending on the individual circumstances, such as combination of material and/or joining geometry. In any case, the plastic material under the focus is heated very rapidly, temperature increase being higher than in case of the rapid feed velocities of quasi simultaneous welding, because the time of irradiation of a certain volume element of the parts being joined is prolonged, it being correspondingly possible to input more energy. Furthermore, the area of the weld seam located ahead of the laser focus in the feed direction is not radiated for a longer time interval than is the case in quasi simultaneous welding. Therefore, as the currently radiated area heats up, in tumble welding a high temperature gradient between the currently radiated area and the area ahead thereof in the direction of feed is generated. Another result consists in the clamping pressure rising locally due to thermal expansion in combination with the obstruction to expansion by the clamping technique.

Proceeding from the relationship of the linear thermal expansion of structures, the heat profile of the process, which describes the march of temperature over the longitudinal coordinate of the weld seam, will directly result in a corresponding profile of height of the weld contour, provided the thermal expansion is not obstructed and the materials are not yet in a plastic condition. In case of a closed weld seam, this profile of height, together with the laser focus, would circulate around the weld seam, which corresponds to a "tumbling" profile of height.

If the thermal expansion of the absorptive part is counteracted by the thermal part being pressed against it, the inferior rigidity and solidity of polymers (as compared to steel and the aluminum material of the machine frame) will give rise to the assumption that there is nearly no expansion. However, this results in a locally strong increase of clamping pressure that circulates along with the temperature maximum. For this local increase of clamping pressure to be produced, any lift of the two clamping arrangements that clamp the two joining parts must be precluded. To this end, the welding system according to the invention must not permit any continuous motion of the clamping plate (by contrast to what is said in U.S. Pat. No. 6,444,946 B1). According to the invention, the clamping arrangement is interlocked in position by a certain clamping power, for example by the locking action of a shoe brake or locking bolt mechanism, or preferably by an electric or pneumatic positioning drive.

The special properties of tumble welding help reduce or avoid the restrictions of quasi simultaneous welding and contour welding:

Due to the obstructed expansion of a work, locally defined, high clamping pressure can build up without load excessively acting on the entire component. Additionally, this local excess of clamping power, combined with the locally raised temperature, enables the two surfaces of contact to match rapidly. This helps create a base for the necessary thermal conduction to the top layer very early in the course of the process (for example after a single or two welding cycles). Since thermal conduction is of extraordinary importance in the build-up of the integral joint, the weld seamed assembly can be produced gently and efficiently.

Since, in tumble welding, as opposed to quasi simultaneous welding, the field of clamping pressure along the weld seam changes permanently in the course of the process, the current local clamping pressure is a characteristic of the local condition of the process. Consequently, any deviation from the desired clamping pressure at a certain spot (for example determined by reference weldments) may signal a single interruption of the weld seam at this spot (for example by a notch). The preferred, locally resolved detection of the clamping pressure along the weld seam can therefore signal locally defined flaws within the weld seam as opposed to the weld seam-run monitoring described in U.S. Pat. No. 6,444,946 B1. Detecting the clamping pressure can take place preferably by the aid of locally resolved pressure measuring films, individual pressure sensors or by strain gages or load cells in combination with segmented clamping elements. If inferior lift of the clamping technique is rendered possible by the clamping frame pressing by inferior spring load on the parts being joined, then the tumbling motion of the clamping frame can be measured by three position measurement sensors (tactile or for example laser triangulation), because the spatial position of the plane is defined by three points. This is also how the process can be characterized. If necessary, the tumbling clamping frame can be arrested in the course of the process.

The detection of local pressure information can also be used for controlling the welding process. The process may for instance be stopped when there is no longer any clamping pressure between the interlocked clamping plates (weld seam completely plasticized).

In tumble welding, the non-plasticized areas of the absorptive part being joined prevent the parts being joined from moving plane-parallel towards each other. Rather, not every spot of the top-layer weld seam has the same vector of velocity at any time; the "tumbling" motion results in a fluctuating (partially coming to a halt) setting motion of the top layer. Nevertheless there is some inferior setting motion by the circulating melt spew owing to the locally excessive clamping pressure. In light of the fact that, in tumble welding, thermal expansion is mainly used for the production of the clamping pressure and sectional areas of the seam are still below the plasticization threshold, the entire melt spew and this setting motion are inferior to quasi simultaneous welding. Consequently, the delivery of energy together with the displaced polymer compound is by far lower.

As opposed to U.S. Pat. No. 6,444,946 B1, it is the aim of tumble welding, after individual radiation, to let the area of the weld seam of the absorptive joining part that is in contact with the top layer cool down as closely as possible to the temperature level prior to the radiation for as much energy as possible to be transported into the top layer. This is intended to minimize the difference in temperature of the bottom and top layer in order to avoid any thermal decomposition of the material, in particular of the bottom layer.

Due to the higher linear energy, plasticization of the absorptive bottom layer is achieved locally defined and more rapidly in tumble welding than in quasi simultaneous welding. In connection with the locally excessive clamping pressure, molten polymer compound can be displaced very rapidly into notches ahead of the laser focus (seen in the direction of feed), these notches thus being closed. Once such a flawed spot has been closed, the necessary thermal conduction to the top layer can start. The process of tumble welding is more tolerant of flaws than quasi simultaneous welding. As compared to contour welding, this effect helps bridge even major joining gaps.

Further features, details and advantages of the invention will become apparent from the ensuing description of various embodiments of tumble welding systems and details thereof, taken in conjunction with the attached drawings.

DESCRIPTION OF PREFERRED EMBODIMENTS

Figure 1:
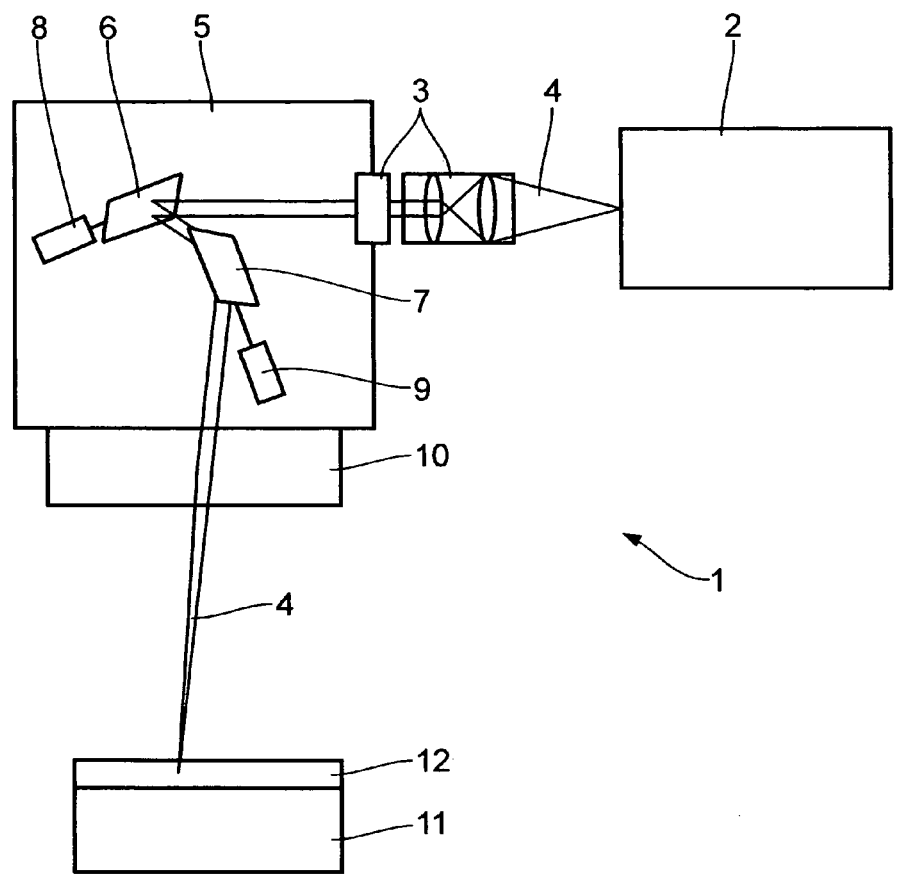
FIG. 1 is a diagrammatic view of a welding apparatus.

As seen in FIG. 1, a tumble welding system 1 includes a laser beam source 2 in the form of a diode or Nd-YAG laser of a wave length of 500 to 1500 nm. Suitable optics 3 form the laser beam 4 and lead it to a scanner 5. Two mirrors 6, 7 are provided therein at an angle relative to each other; each of them is adjustable about a pivoting axis by corresponding positioning motors 8, 9. Thus the laser beam 4 is conventionally deflectable in any directions in space.

By the positioning motors 8, 9 being correspondingly triggered, the laser beam 4 can be directed by the scanner via focusing optics 10 to the component parts to be weld seamed 11, 12. The bottom part 11 is made of laser-irradiation absorptive thermoplastic material, whereas the part 12 that constitutes the top layer is laser-irradiation transmissive. In the way mentioned at the outset, irradiation welding will take place by heating and melting of the bottom part and corresponding thermal conduction into the top part, accomplishing a weld seamed assembly of molten material of the two parts 11, 12 along a weld seam S as seen for example in FIG. 4.

By the aid of the scanner 5, the laser beam 4 passes across the component parts to be weld seamed 11, 12, circulating in several cycles along the area of joining at a feed velocity of approximately 500 to 600 mm/s.

Figure 2:
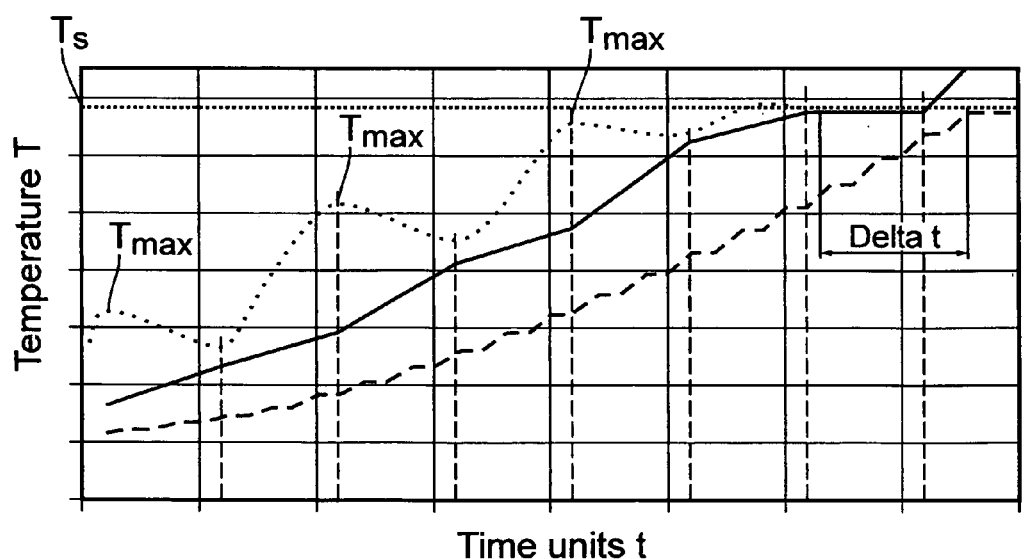
FIG. 2 is a temperature-time-comparison diagram of quasi simultaneous welding and tumble welding.

FIG. 2 is a qualitative illustration of the march of temperature, as compared to time, in a volume element of the part 12 that constitutes the top layer in the vicinity of the area of joining. The volume element absorbs a negligible quantity of radiation and is heated exclusively by heat conduction from the bottom part 11. A dashed line in FIG. 2 illustrates the march of temperature in a simulated quasi simultaneous polycarbonate welding process at 3000 mm/s and 80 Watt laser power. The solid line reflects a correspondingly simulated tumble welding process at a feed velocity of 600 mm/s, using otherwise identical laser parameters and materials. The dotted line in FIG. 2 is a free-hand illustration of the qualitative march of temperature in the laser-absorptive part 11, attention being drawn to the fact that the absolute temperature there may be clearly higher—by more than 100° C.—than the temperature of the transmissive top layer part 11. Each local maximum of the dotted march reflects the circulating temperature maximum $T_{max}$, with the absolute amount of this maximum rising from cycle to cycle. On the whole FIG. 2 shows that, in tumble welding according to the invention, the top-layer volume element under regard is heated more rapidly by the time $\delta t$ so that the melting temperature $T_S$ is reached more rapidly.

As for the dashed and solid simulation curve of FIG. 2, the following formula has been discretized and solved iteratively $$\rho \cdot c_P \cdot \frac{\partial T}{\partial} = div(\lambda \cdot gradT) + \dot{q}_V$$

specifying
$\rho$: density
$c_p$: specific thermal capacity $\frac{\partial T}{\partial t}$: temporal temperature modification λ: thermal conductivity
gradT: gradient temperature
$\dot{q}_v$: volume heating power.

The formula describes the temporal temperature modification of a structure with internal energy sources and thermal conduction.

The delivery of energy into the bottom layer (component part 11) is increased by the raised heat conduction in tumble welding, but it is only the heat flux into the top layer (component part 12) that is decisive for the formation of a weld seam, because the desired integral joint can only be attained after melting of the top layer.

In conclusion, the raised heat flux into the top layer (component part 12) in combination with the decreased delivery of energy by melt spew considerably increases the process efficiency as compared to the method of U.S. Pat. No. 6,444,946 B1.

Figure 3:
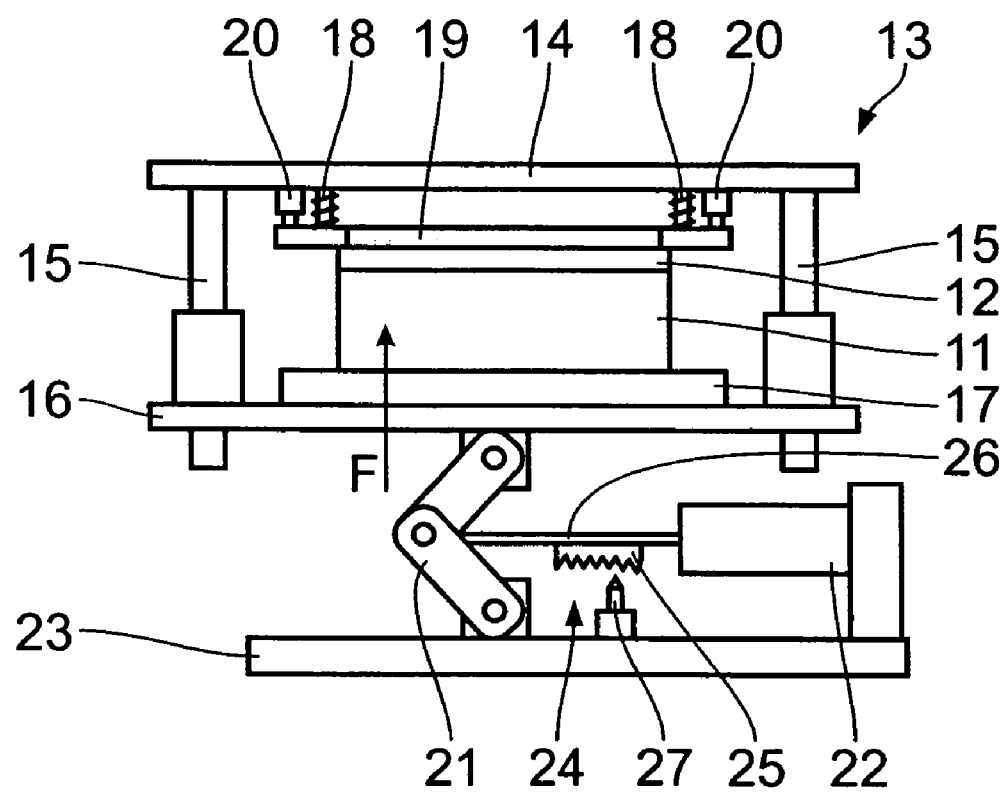
FIG. 3 is a diagrammatic side view of a first embodiment of a clamping device including the two parts to be weld seamed.

FIG. 3 illustrates a clamping device for the component parts 11, 12 which is designated by 13 in its entirety. Fundamentally, a stationary top clamping plate 14 and a bottom clamping plate 16 are used for clamping, the bottom plate 16 being displaceable towards the top plate 14 on a linear guide 15. By way of a work carrier 17, the bottom clamping plate 16 holds the absorptive bottom part 11. A clamping frame 19 is mounted on the top clamping plate 14, floating by way of spring elements 18; the clamping frame 19 fixes the transmissive top part 12. This floating way of mounting is very rigid and does not allow any major motion, ensuring obstruction to expansion and thus increase of clamping pressure. It is only necessary to show the "tumbling" i.e., the field of clamping pressure of the top clamping plate that circulates together with the laser. To this end, feedback measurement sensors 20 are placed between the clamping frame 19 and the top clamping plate 16, detecting any slight deviation of the clamping frame 19 from a given position in parallel to the plane of the clamping plate 14.

By alternative to the above construction, the circulating field of clamping pressure can also be detected by a locally resolved clamping-pressure film that is integrated into the clamping system.

By way of a positioning drive in the form of a toggle mechanism, the bottom clamping plate 16 is displaceable towards the top clamping plate 14 by means of a piston-cylinder drive 22 as an actuator. The toggle mechanism 21 and the piston-cylinder drive 22 are mounted on a stand member 23.

For tumble welding of the two component parts 11, 12, the bottom clamping plate 16 is moved towards the top clamping plate 14 by a given clamping power by the aid of the piston-cylinder drive 22 and then blocked in the closed position by the aid of the interlocking unit 24. The interlocking unit 24 comprises a rack 25 on the piston rod 26 of the piston-cylinder drive 22 and a locking bolt 27, the engagement of which with the rack 25 precluding any displacement within the positioning drive of the bottom clamping plate 16.

As explained in the introductory part, a locally defined, circulating clamping-pressure maximum forms in the area of joining between the two parts 11, 12, owing to the local expansion of the parts conditioned by melting, this clamping-pressure maximum providing for corresponding, though strictly limited, tumbling motion of the clamping frame 19. This motion is detected by the feedback measurement sensors 20 and, being a measure for the circulating clamping pressure maximum, can be used as a parameter for the control of the welding process by a control unit (not shown in detail).

Figure 4:
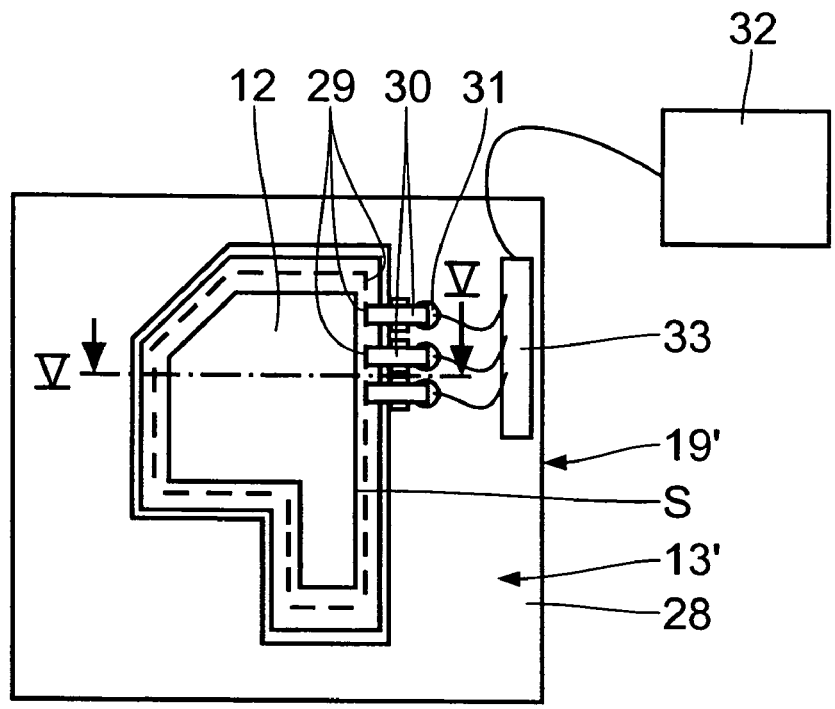
FIGS. 4 and 5 are a diagrammatic plan view and a sectional view, respectively, on the line V-V of FIG. 4 of a second embodiment of a clamping device.
Figure 5:
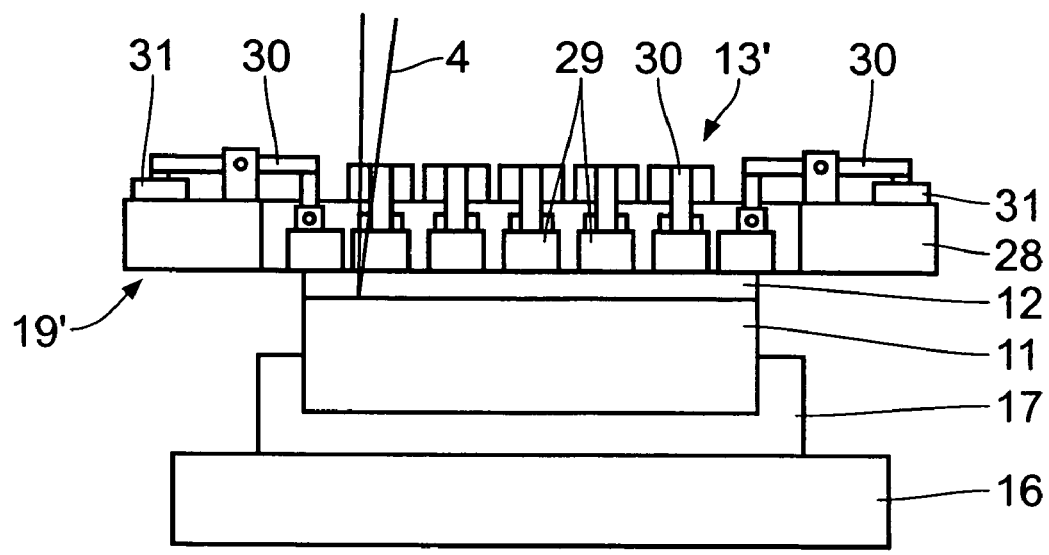

FIGS. 4 and 5 illustrate a further development of the clamping device designated by 13' in the vicinity of the top clamping arrangement. Instead of the clamping plate, it comprises a framework 28, on which individual clamping segments 29 are mounted by way of pivoted levers 30; they run in accordance with the weld contour S, which is outlined by a dashed line in FIG. 4. The clamping segments 29, in their entirety, serve as a back-up for the transmissive top part 12. The pivoted levers 30 are double-armed, with the arm opposite the respective clamping segment 29 acting on a force sensor 31 which detects the force applied to the clamping segment 29 and transmitting it via a bus line 33 to a corresponding control unit 32. The force sensors 31 are coupled with the bus line 33.

By the actuation force of the clamping segments 29 being detected individually, the locally prevailing clamping force of the clamping device 13' can be detected. As explained at the outset, any notches of the bottom part, flaws of the weld seam and similar deficiencies can be discovered in this way.

What is claimed is:

1. A method of irradiation welding of two thermoplastic component parts by production of a weld seam in an area of joining between absorptive and transmissive component parts by means of an energy beam that passes through the transmissive component part and is absorbed by the absorbtive component part,
    wherein the energy beam acts on the absorptive component part in several cycles such that a local temperature maximum ($T_{max}$), which circulates together with the energy beam and increases from cycle to cycle, and correspondingly circulating, locally increased clamping pressures are generated along the area of joining;
    wherein the transmissive component part is continuously heated in the area of joining by the absorptive component part, corresponding to the circulating temperature maximum ($T_{max}$);
    wherein a welding process then takes place by plasticization of the two component parts in a circulating area of plasticization that is defined in the longitudinal direction of a weld seam, equally corresponding to the circulating temperature maximum ($T_{max}$); and
    wherein the two component parts are interlocked during the heating process by a clamping device that produces a minimum clamping power, and wherein a feed velocity of the energy beam ranges between approximately 200 mm/s and 1000 mm/s, shaker cycle time.

2. A method according to claim 1, wherein the clamping pressure (F) of the clamping device that acts on the two component parts is detected, locally resolved by way of the clamping length, for one of monitoring and control of the welding process.

3. A method according to claim 1, wherein the clamping force of the clamping device is variably adjustable.

4. The method according to claim 1, wherein the energy beam is a laser beam.

5. The method according to claim 1, wherein the feed velocity of the energy beam ranges between approximately 500 mm/s and 600 mm/s.

6. An apparatus for irradiation welding of two thermoplastic component parts by production of a weld seam in an area of joining between the absorptive and transmissive component parts, comprising
    a beam source and a beam guide for production and guidance of an energy beam, in particular laser beam, towards the absorptive component part through the transmissive component part;

a beam deflection unit for displacement of the energy beam in cycles along the area of joining, corresponding to the weld seam, such that a local temperature maximum ($T_{max}$), which circulates together with the energy beam and increases from cycle to cycle, and correspondingly circulating, locally increased clamping pressure are generated along the area of joining;

a clamping device that interlocks both component parts by a minimum clamping power; and wherein the clamping device for each of the two component parts comprises a clamping arrangement, namely a stationary clamping arrangement, including a positioning drive and a positionable clamping arrangement, the positioning drive of which is blockable by an interlocking unit.

7. An apparatus according to claim 6, wherein at least one clamping arrangement is provided with a floating, spring-loaded clamping frame, a position of which in space is detectable by a position-sensor unit.

8. The apparatus according to claim 6, wherein the interlocking unit comprises one selected from the group consisting of a braking mechanism and a locking-bolt mechanism.

9. The apparatus according to claim 6, wherein the interlocking unit is designed to combine with the positioning drive as one selected from the group consisting of an electric positioning system and a pneumatic positioning system.

10. An apparatus for irradiation welding of two thermoplastic component parts, said component parts comprising an absorptive component part and a transmissive component part by production of a weld seam in an area of joining between the absorptive and transmissive component parts comprising:

(a) a beam source and a beam guide for producing and guiding an energy beam towards the absorptive component part through the transmissive component part;

(b) a beam deflection unit for displacing an energy beam in cycles along the area of joining corresponding to the weld seam, such that a local temperature maximum ($T_{max}$), which circulates together with the energy beam and increase from cycle to cycle, and correspondingly circulating, locally increased clamping pressures are generated along the area of joining; and (c) a clamping device that interlocks both components parts by a minimum of clamping power, (d) wherein at least one clamping arrangement is provided with a segmented clamping frame, each clamping segment being coupled with a force sensor for detecting the clamping force that prevails locally in the vicinity of the respective clamping segment.

* * * * *